(12) United States Patent
Nishikawa

(10) Patent No.: US 6,661,452 B1
(45) Date of Patent: Dec. 9, 2003

(54) DIGITAL CAMERA CAPABLE OF DECREASING A REQUIRED MEMORY CAPACITY

(75) Inventor: Masahiko Nishikawa, Nara (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 09/252,679

(22) Filed: Feb. 22, 1999

(30) Foreign Application Priority Data

Feb. 23, 1998 (JP) .......................................... 10-040750

(51) Int. Cl.[7] .......................... H04N 5/228; H04N 7/26; G06K 9/36; G06K 9/46
(52) U.S. Cl. ...................... 348/222.1; 382/232; 386/109
(58) Field of Search ...................... 348/222.1; 382/232; 386/109

(56) References Cited

U.S. PATENT DOCUMENTS

| | | | |
|---|---|---|---|
| 5,153,730 A | * 10/1992 | Nagasaki et al. | 348/231.6 |
| 5,164,831 A | * 11/1992 | Kuchta et al. | 348/231.7 |
| 5,822,493 A | * 10/1998 | Uehara et al. | 386/109 |
| 5,822,542 A | * 10/1998 | Smith et al. | 709/247 |
| 5,861,962 A | * 1/1999 | Maeda | 358/451 |
| 5,907,638 A | * 5/1999 | Onodera | 382/239 |
| 6,043,845 A | * 3/2000 | Thompson | 375/240.01 |

FOREIGN PATENT DOCUMENTS

| JP | 3-58685 | 3/1991 |
|---|---|---|
| JP | 10-145716 | 5/1998 |

* cited by examiner

*Primary Examiner*—Wendy R. Garber
*Assistant Examiner*—James Hannett
(74) *Attorney, Agent, or Firm*—Armstrong, Kratz, Quintos, Hanson & Brooks, LLP

(57) ABSTRACT

A digital camera includes an SDRAM. The camera data taken is first written on a camera data area formed in the SDRAM, and thereafter read out 8 lines a time. This 8-lines camera data is YUV-converted by a signal precessing circuit. The resulting 8-lines YUV data is stored in a work area of the SDRAM. A JPEG CODEC reads the YUV data block by block out of the work area, and compresses it. The compressed data is written block by block over the camera data area. At this time, the compressed data is written over in a manner. avoiding camera data uncompleted of compression. Such a process is repeated very 8 lines. If compressed data is obtained for all of the camera data stored within the camera data area, the compressed data is recorded at one time into a flash memory.

7 Claims, 9 Drawing Sheets

| Cy | Ye | Cy | Ye | Cy |     |  | Ye | Cy | Ye |
|----|----|----|----|----|-----|--|----|----|----|
| Mg | G  | Mg | G  | Mg |     |  | G  | Mg | G  |
| Cy | Ye | Cy | Ye | Cy | ··· |  | Ye | Cy | Ye |
| Mg | G  | Mg | G  | Mg |     |  | G  | Mg | G  |
|    |    | ·  |    |    |     |  |    | ·  |    |
|    |    | ·  |    |    |     |  |    | ·  |    |
|    |    | ·  |    |    |     |  |    | ·  |    |
| Mg | G  | Mg | G  | Mg | ··· |  | G  | Mg | G  |
| Cy | Ye | Cy | Ye | Cy |     |  | Ye | Cy | Ye |

512 ADDRESSES
16 BITS
2048 ADDRESSES

| CAMERA MODE DISPLAY DATA AREA (640 × 240) (300 KBYTES) |
| CAMERA DATA AREA (ODD FIELD) |
| CAMERA DATA AREA (EVEN FIELD) (TOTALLY 1.5 MBYTES) |
| JPEG WORK AREA (40 KBYTES) |
| THUMBNAIL WORK AREA (40 KBYTES) |
| SOFT WORK AREA (88 KBYTES) |
| CHARACTER AREA (36 KBYTES) |

| AREA | HEAD ADDRESS |
|---|---|
| DISPLAY DATA AREA | 0 |
| CAMERA DATA AREA | 300 |
| JPEG WORK AREA | 1844 |
| THUMBNAIL WORK AREA | 1884 |
| SOFT WORK AREA | 1924 |
| CHARACTER AREA | 2012 |

(B)

| AREA | HEAD ADDRESS |
|---|---|
| DISPLAY DATA AREA | 0 |
| CAMERA DATA AREA | 300 |
| COMPRESSION DATA AREA | 1071 |
| JPEG WORK AREA | 1844 |
| THUMBNAIL WORK AREA | 1884 |
| SOFT WORK AREA | 1924 |
| CHARACTER AREA | 2012 |

(C)

| AREA | HEAD ADDRESS |
|---|---|
| DISPLAY DATA AREA | 0 |
| COMPRESSION DATA AREA | 600 |
| JPEG WORK AREA | 1844 |
| SOFT WORK AREA | 1884 |
| CHARACTER AREA | 2012 |

INPUT LINE DATA ─────────────

·········································· ODD LINE DATA

—·—·—·—·—·—·—·—·—·— EVEN LINE DATA

INPUT LINE DATA ─────────────

·········································· ODD LINE DATA

—·—·—·—·—·—·—·—·—·— EVEN LINE DATA

INPUT LINE DATA ─────────────

JPEG WORK AREA

DIGITAL CAMERA CAPABLE OF DECREASING A REQUIRED MEMORY CAPACITY

BACKGROUND OF THE INVENTION

1. Field of the Invention

The present invention relates to digital cameras, and more particularly to a digital camera which compresses photographic image data according to a JPEG format and records the compressed data on a recording medium such as a flash memory.

2. Description of the Related Art

In a conventional digital camera, the photographic image data is temporarily stored within a memory such as a DRAM. This image data is compressed block by block. When compression of all the blocks is completed the compressed data is then recorded on a recording medium.

In such a digital camera, however, the compressed data must be once stored in a work area of the DRAM. This, accordingly, has resulted in a problem that the capacity of the DRAM increases as the CCD increases in the number of pixels.

Meanwhile, Japanese Patent Laying-open No. H10-145716 laid open on May 29, 1998 discloses a technology wherein the compressed data is once stored within a vacant area of a frame memory and thereafter rewritten onto a flash memory. However, this method utilizing a vacant area as a buffer memory still requires a memory capacity to offer a vacant area to be secured.

SUMMARY OF THE INVENTION

It is therefore a primary object of the present invention to provide a digital camera which is capable of decreasing a required memory capacity.

According to the present invention, a digital camera comprises: a memory having at least an image data area; an image taking means for taking a photographic subject image and outputting first image data having a predetermined number of frames; a first writing means for writing the first image data to the image data area; a compressing means for compressing the first image data by a predetermined amount; an overwriting means for writing compressed data outputted from the compressing means over the image data area; and a recording means for recording the compressed data written on the image data area into a recording medium.

If the predetermined number of frames of the first image data is outputted from the image taking means, the first writing means writes the outputted first image data to the image data area formed in the memory. The compressing means compresses, in the predetermined amount; the first image data written on the image data area. The compressed data thus obtained is written over the image data area by an overwriting means. If the compressed data is stored in the image data area, the recording means records this compressed data onto the recording medium. It is possible to reduce the memory capacity by writing the compressed data over the image data area by the overwriting means.

In a certain aspect of the present invention, the overwriting means writes the compressed data to the image data area in a manner avoiding the first image data unprocessed by the compressing means.

In another aspect of the present invention, the memory further possesses a first work area, and the compressing means including a data processing means to perform a predetermined process on the first image data to create a second image data, a storing means to store the second image data in the first work area, a first reading means to read the second image data in the predetermined amount out of the first work area, and a data compressing means to compress the predetermined amount of the second image data. As a result, compressed data is obtained.

In one embodiment of the present invention, the data compressing means compresses the second image data according to a JPEG format. In another embodiment of the present invention, the first image data has color components different on a pixel-by-pixel basis, and the predetermined data process including YUV conversion. In another embodiment of the present invention, a thumbnail creating means creates thumbnail image data from the second image data, wherein the recording means records the compressed data together with the thumbnail image data into the recording medium. Incidentally, the memory further possesses a second work area, and the thumbnail creating means creating the thumbnail image data using the second work area.

In still another aspect of the present invention, the first image data is interlace scan data, and the first writing means writing odd field data and even field data separately into the image data area.

In another aspect of the present invention, if a particular mode is set, a disabling means disables the overwriting means and an enabling means enables a forming means and a third writing means, thereupon, a compression data area is formed in the memory by the forming means, and the compressed-data outputted from the compressing means is written to the compression data area by the third writing means. The recording means records the compressed data written in the data area to the memory medium.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 2 is an illustrative view showing a color filter;

FIG. 7 is an illustrative view showing head addresses for respective areas mapped up within the SRAM, in a normal camera mode, a continuous-shot mode and a reproduce mode;

FIG. 8 is an illustrative view showing YUV data;

FIG. 9 is an illustrative view showing operation of a pseudo framing circuit;

DETAILED DESCRIPTION OF THE PREFERRED EMBODIMENTS

Figure 1:
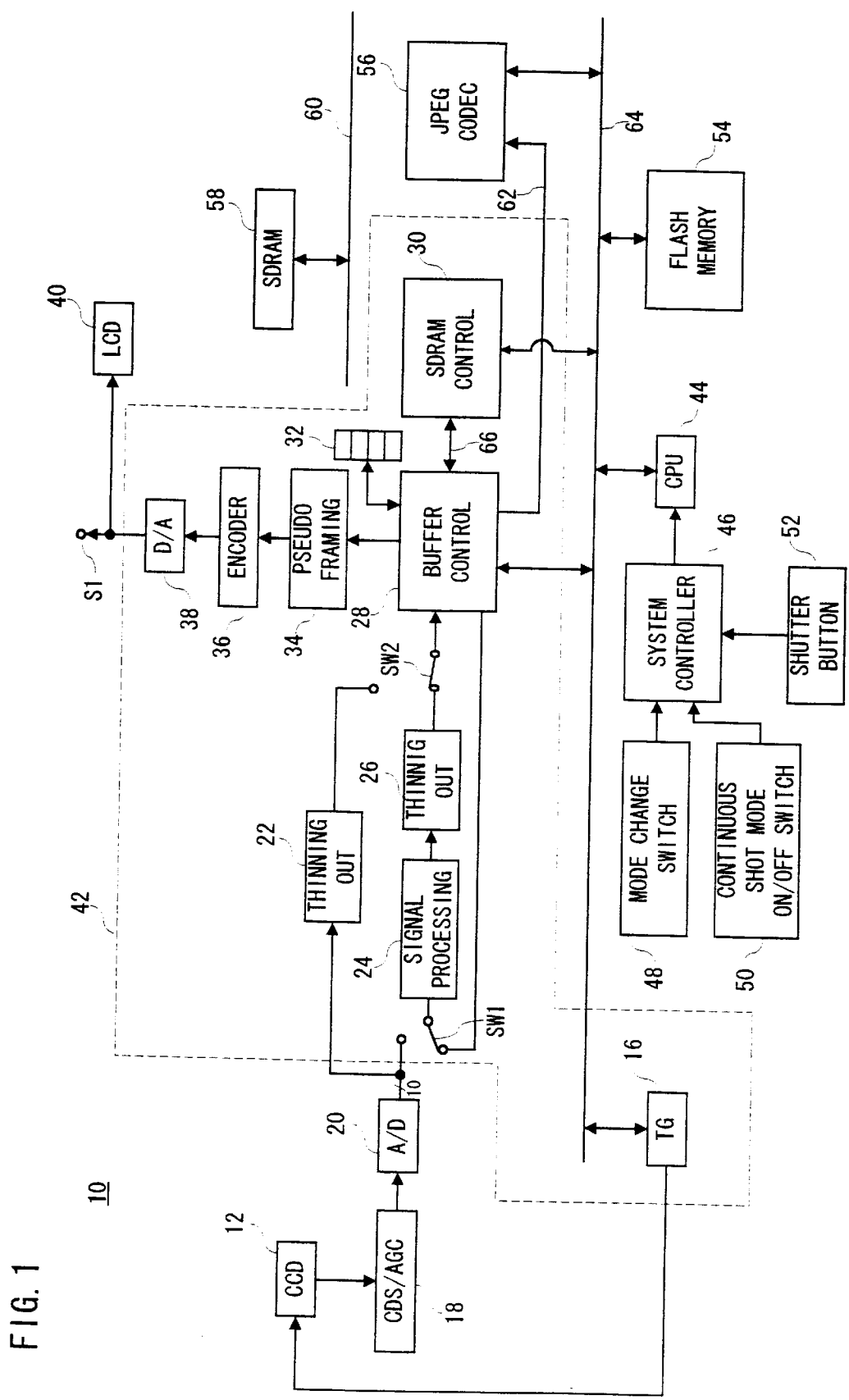
FIG. 1 is a block diagram showing one embodiment of the present invention.

Referring now to FIG. 1, a digital camera 10 of this embodiment includes a CCD imager 12. The CCD imager 12 possesses pixels in number of approximately 1.2 million, that is, 1280 pixels present in a horizontal direction and 960 pixels in a vertical direction. Due to this, it requires a time period of 1/7.5 seconds to read camera signals in all lines out of the CCD imager 12. A subject optical image is taken into the CCD imager 12 constructed as above through a color filter 14 having Cy, Ye, Mg and G arranged in a mosaic form, as shown in FIG. 2.

In a camera mode to display real-time motion images on an LCD 40, camera signals are outputted from the CCD imager 12 which have been subjected to vertically thinning-out in the number of lines down to ¼. If considering on vertically consecutive 8 lines, outputted are only a first line having Cy, Ye, . . . and a fourth line having Mg, G, . . . , while the other line signals are swept away. Accordingly, a camera signal with 1280 pixels×240 lines outputted from the CCD imager 12 contains, alternately, a line having Cy, Ye, . . . and a line having Mg, G. Because the number of lines are vertically thinned out to ¼, it requires 1/30 seconds to output a camera signal having 1280 pixels×140 lines.

Incidentally, if the operator sets a mode change switch 48 to a camera side, a system controller 46 sends a camera-mode set command to a CPU 44. ASIC 42 has therein a timing generator 16 that is controlled by the CPU 44. The timing generator 16, in the camera mode, outputs a timing signal in order to cause the CCD imager 12 to output only the predetermined lines as mentioned above.

A camera signal outputted from the CCD imager 12 is subjected to well-known noise removal and level adjustment by a CDS/AGC circuit 18. The camera signal thus processed is converted, at a clock rate of 12 MHz, into 10-bit digital data (camera data) by an A/D converter 20. In the camera mode, a switch SW1 is connected to an A/D converter 20 side while a switch SW2 is connected to a thinning-out circuit 26 side. Furthermore, the thinning-out circuit 26 is set in thin-out ratio respectively at horizontally "½" and vertically "0". Due to this, the camera data outputted from the A/D converter 20 is subjected to color separation and YUV conversion by a signal processing circuit 24. Consequently, the YUV data is thinned-out in the number of horizontal pixels down to "640" by the thinning-out circuit 26. Thus the YUV data of 640 pixels×240 lines is inputted through the switch SW2 to a buffer control circuit 28. It is noted that the CPU 44 performs switching of the switches SW1 and SW2 and setting of the thin-out ratio by the thinning-out circuit 26.

Figure 3:
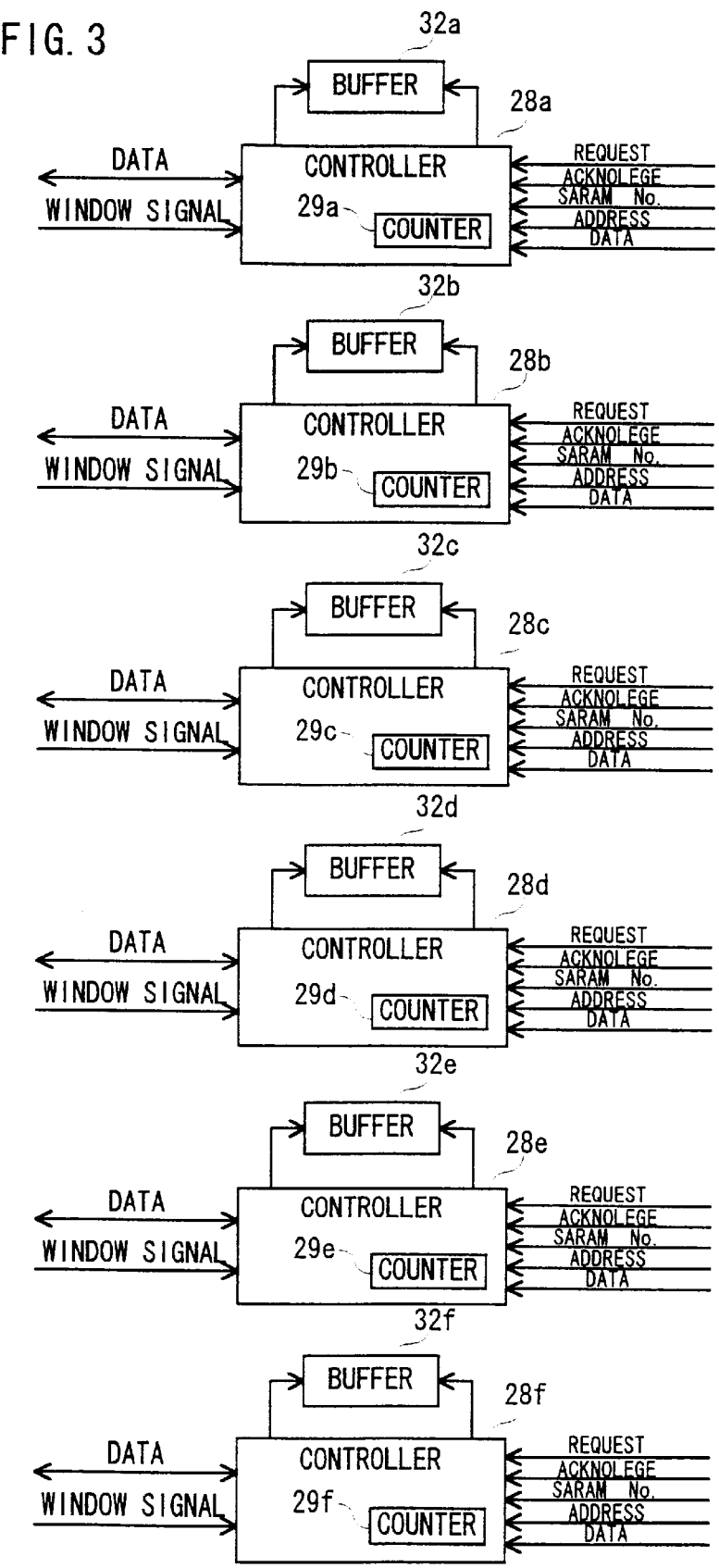
FIG. 3 is an illustrative view showing a buffer control circuit and a buffer.

The buffer control circuit 28 and the buffer 32 are concretely configured as shown in FIG. 3. The buffer control circuit 28 is provided with six controllers 28a–28f which are assigned with respective buffers 32a–32f formed by SRAM. The controllers 28a–28f have respective counters 29a–29f. These counters 29a–29f are loaded by address data given from the CPU 34.

The YUV data via the switch SW2 is inputted to the controller 28a. Simultaneously, a window signal is inputted from a timing generator 16 in order to define an effective area of the CCD imager 12. The controller 28a, only when the window signal is high in level, writes the YUV data onto the buffer 32a at a clock rate of 12 MHz and reads the same YUV data out of the buffer 32a at a clock rate of 48 MHz. The read YUV data is consecutively inputted to an SDRAM control circuit 30. The controller 28a also receives from the CPU 44 head address data of an area to be written on by this YUV data, and determines a write address for the YUV data based on this head address data as reference. That is, the head address is loaded onto a counter 29a to increment this counter 29a at a clock rate of 48 MHz. In concurrent with YUV data input, count values or write address data are inputted every four addresses into the SDRAM control circuit 30.

Figure 4:
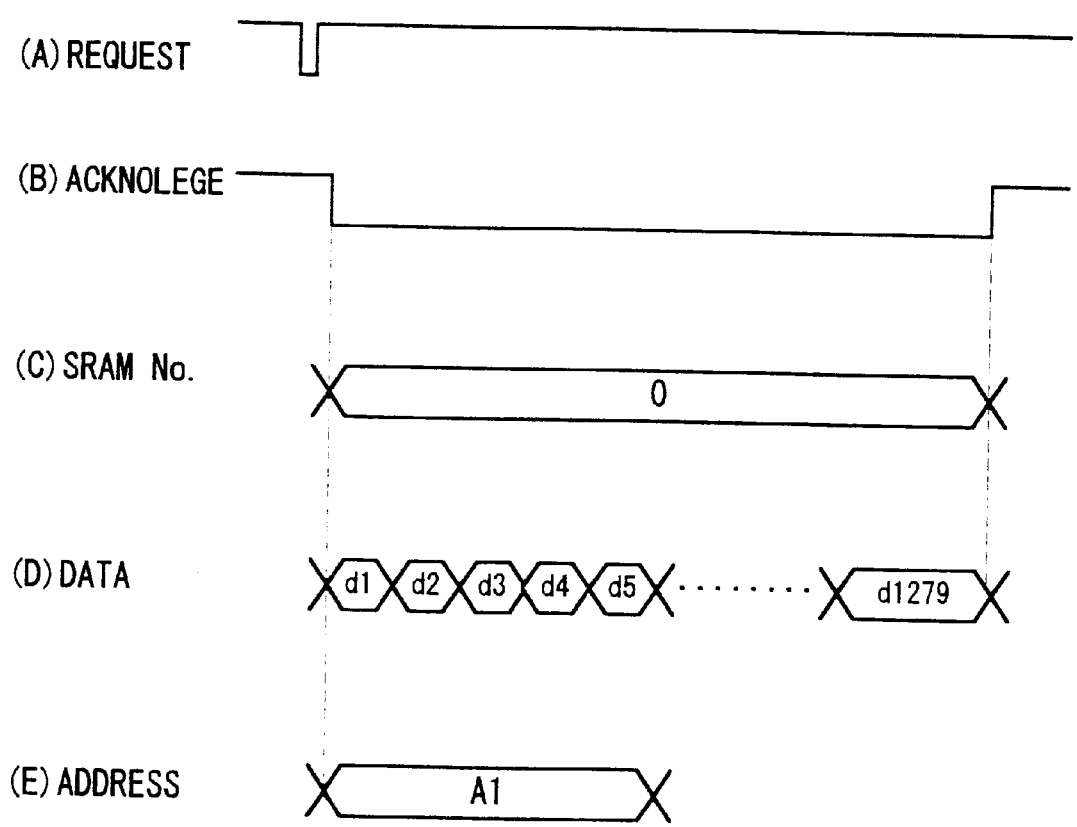
FIG. 4 is a timing chart showing part of operation of the buffer control circuit.

Referring to FIG. 4 to explain in greater detail, the controller 28a first outputs a request signal REQUEST shown in FIG. 4(A) to the SDRAM control circuit 30. Then the controller 28a outputs YUV data shown in FIG. 4(D) and address data shown in FIG. 4(E) to the SDRAM control circuit 30, in response to the acknowledge signal ACKNOWLEDGE shown in FIG. 4(B) from the SDRAM control circuit 30 and an identification number of the buffer 32a (SRAM No.) shown in FIG. 4(C). The SDRAM control circuit 30 supplies the acknowledge signal ACKNOWLEDGE and identification number to all the controllers 28a–28f. According to the identification number, only the corresponding controllers output their data. Thus the SDRAM control circuit 30 operates also as a mediation circuit.

Incidentally, the controller 28a and the SDRAM control circuit 30 communicate with any signal or data through a bus 66 provided therebetween. Such signal or data communications are made not only by the controller 28a but also the controllers 28b–28f. Furthermore, data communication with a JPEG CODEC 56 are through the use of a bus 62 or 64.

The SDRAM control circuit 30 writes the input YUV data into a desired address of the SDRAM 58 via the bus 60. That is, the SDRAM control circuit 30 writes 4 addresses of YUV data into 4 addresses at sites following an address given by the inputted address data. The SDRAM control circuit 30, in response to a next address data input, writes next 4 addresses of YUV data into 4 addresses at sites following an address given by that next address data. The counter 29a is loaded by a head address of a display data area shown in FIG. 6. The YUV data is written into this display data area. The SDRAM control circuit 30 also executes writing at a clock rate of 48 MHz.

Figure 5:
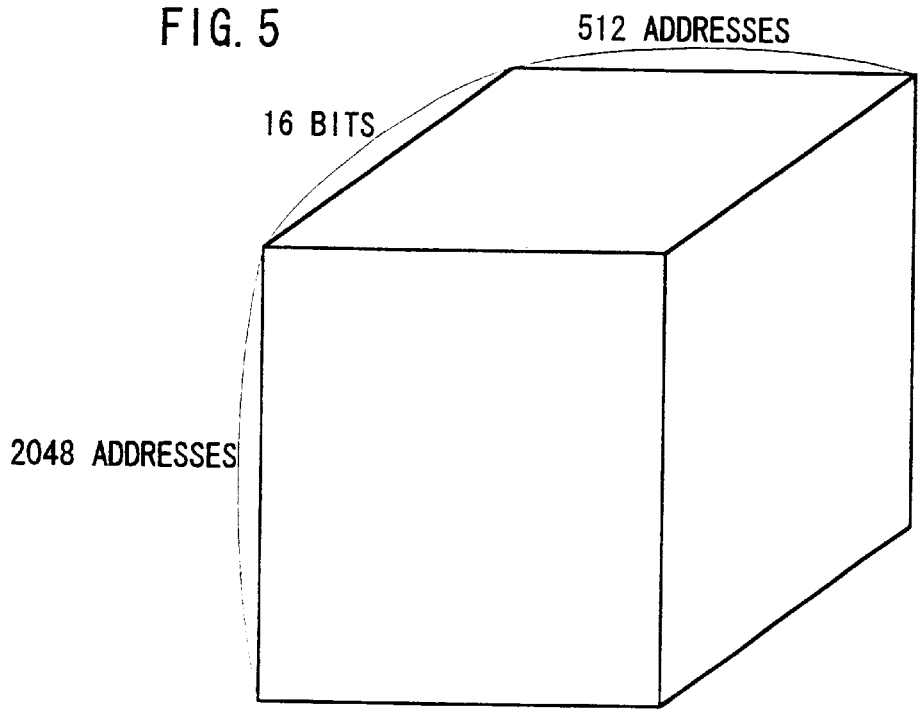
FIG. 5 is an illustrative view showing an SDRAM.
Figure 6:
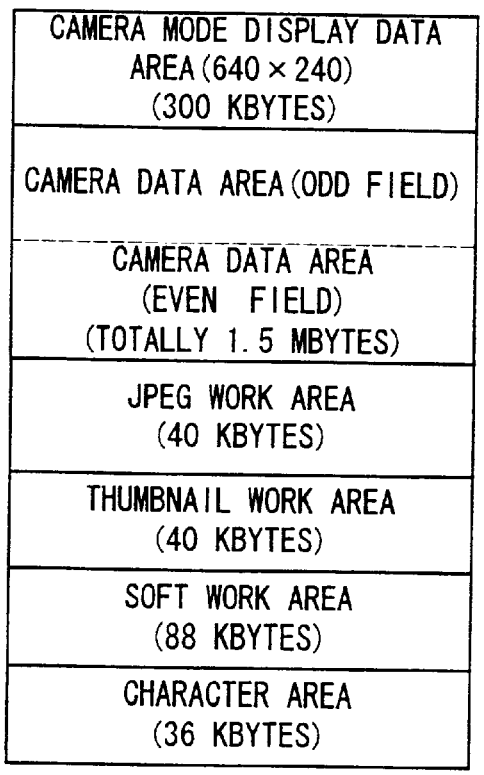
FIG. 6 is an illustrative view showing an SDRAM mapping state in an ordinary camera mode.

In this manner, the access to the SDRAM 58 does not always require address data but may be given by intermittent address data. Such SDRAM 58 characteristics together with the 48 MHz clock rate make possible to realize high speed accessing. The SDRAM 58 possesses addresses in number of 512 in a column (horizontal) direction and 2048 in a row (vertical) direction as shown in FIG. 5, wherein each address is 16 bits. In the camera mode, the CPU 44 loads the respective head addresses of the areas shown in FIG. 7(A) to perform mapping on the SDRAM 58 as shown in FIG. 6. Formed on the SDRAM 58 are a display data area of 300 K bytes, a camera data area of approximately 1.5 M bytes, a JPEG data area of 40 K bytes, a thumbnail data area of 40 K bytes, a soft work area of 88 K bytes and a character area of 36 K bytes.

The signal processing circuit 24 performs so-called 4:2:2 conversion to thereby create YUV data, as shown in FIG. 8. Because the Y data, the U data and the V data are each 8 bits, 4 pixels of YUV data has a data amount of 64 bits or 4 addresses. The YUV data, in average, is 16 bits (2 bytes) per pixel, while the YUV data of 640 pixels×240 lines to be outputted from the thinning-out circuit 26 is 307200 bytes (300 K bytes). Because the display data area has the capacity 300 K bytes as stated above, the YUV data having 640 pixels×240 lines can be appropriately stored within the display data area.

The YUV data stored in the display data area is read out by the SDRAM control circuit 30 when the bus 60 is in open. Because the SDRAM 58 can be accessed at the high-speed clock rate of 48 MHz, the YUV data can be read out while the bus 60 is in open. To create 1 frame of image, the SDRAM control circuit 30 performs twice YUV data reading out. Thereupon, the controller 28b shown in FIG. 3 inputs address data to the SDRAM control circuit 30 every four addresses. The SDRAM control circuit 30, in turn, reads out desired data at the clock rate 48 MHz. The read YUV data is given to the controller 28d, the clock rate being returned to 12 MHz by the buffer 32b.

The YUV data is then inputted from the controller 28b to the pseudo framing circuit 34 where each line data is given by a predetermined weight. More specifically, the YUV data inputted in a first half of one frame period is given by a weight amount "0.25", while the YUV data in a latter half of the one frame period is by a weight amount "0.75". Due to this, odd line data and even line data are created in a pseudo fashion from respective ones of inputted line data, as shown in FIG. 2. The interlace scan data thus obtained is passed through an encoder 36, and thereafter converted into an analog signal by a D/A converter 38. This analog signal, or interlace-scanned YUV signal, is outputted via an output terminal Si and at the same time inputted to an LCD 40. Thus, real-time motion pictures are displayed on the LCD 40.

In a state of displaying motion pictures, if a shutter button 52 is depressed by the operator, then the system controller 46 sends a picture-taking command to the CPU 24. Thereupon, the CPU 44 connects the switch SW1 to the buffer control circuit 28 side and the switch SW2 to the thinning-out circuit 22 side. The CPU 44 also controls a timing generator 16 so that all-lines camera signals can be outputted according to an interlace scan method from the CCD imager 12. Due to this, 1 screen of interlace scan camera signals are outputted at rate of 1/7.5 second from the CCD imager 12. This camera signal is sent via a CDS/AGC circuit 18 to the A/D converter 20. When 1/7.5 second is elapsed from depressing the shutter button 52, the CCD imager 12 is disabled by the CPU 44. That is, after depressing the shutter button 52, only 1-screen camera signals can be obtained.

The all-lines camera data is then inputted from the A/D converter 20 to the thinning-out circuit 22. At this instance, the thinning-out circuit 22 is set in thin-out rate to "0" in respective vertical and horizontal directions, and the all-lines camera data is given as it is to the controller 28a. The controller 28a is also loaded with a head address of a camera data area formed in the SDRAM 58. The controller 28a stores the inputted camera data temporarily in the buffer 32a, and thereafter sends it together with address data to the SDRAM control circuit 30. This address data is also created based on the loaded head address data as a reference. Thus, the SDRAM control circuit 30 writes the inputted camera data onto the camera data area as shown in FIG. 6.

Incidentally, because this camera data is interlace scan data, odd field data is stored into a first half of the camera data area and even field data is in a latter half. That is, odd and even field areas are formed in the camera data area.

The all-lines camera data to be obtained upon operating a shutter button 52 includes 1280 pixels×960 lines, wherein each pixel data is 10 bits. This means that the all-lines camera data has a data amount of 1536000 bytes (=1280 pixels×960 liens×10 bits/8 bits), i.e., 1.5 M bytes which can fully stored within the camera data area. Incidentally, because the addresses on the SDRAM 58 is each 16 bits as shown in FIG. 5, writing 8 pixels of camera data thereon require 5 addresses.

After the writing is completed for the all lines of the camera data, the SDRAM control circuit 30 reads this camera data according to the address data given from the controller 28d. At this time, the camera data is read line by line alternately from an odd field and an even field area. This converts the interlace scan data into progressive scan data. The SDRAM control circuit 30 supplies the progressive scan data thus read to the controller 28d. The controller 28d, in turn, supplies the input progressive scan data to the signal processing circuit 24 through the switch SW1. Due to this, the camera data having Cy, Ye, Mg and G is subjected to color separation and YUV conversion, being created into YUV data with 1280 pixels×960 lines. The thinning-out circuit 26 is set in thin-out ratio at horizontally "1/2" and vertically "1/4" by the CPU 44. This makes the YUV data of 1280 pixels×960 lines into YUV data of 640 pixels×240 lines.

When all lines of the camera data have been written to the camera data area, the CPU 44 switches the switch SW2 over to a thinning-out circuit 26 side. Due to this, the YUV data outputted from the thinning-out circuit 26 is again inputted to the controller 28a through the switch SW2. The controller 28a writes this YUV data onto the display data area in a same manner as in displaying motion images. Further, when this writing-in is completed, the controller 28b reads out the same YUV data and outputs it to the pseudo framing circuit 34. This causes an image given upon operating the shutter button 52, i.e., a freeze image same as a record image, to be displayed on the LCD 40.

After displaying a freeze image on the LCD 40, the controller 28d again reads the all-lines camera data out of the camera data area. In also this case, the camera data is read line by line alternately from an odd field area and an even field area. However, the reading-out is on every 8 lines. The controller 28d supplies the 8-lines progressive scan data thus read again to the signal processing circuit 24. At this time the CPU 44 sets the thin-out ratio of the thinning-out circuit 26 to "0" in the respective horizontal and vertical directions. Accordingly, the YUV data of 1280 pixels×8 lines outputted from the signal processing circuit 24 is sent as it is back to a controller 28a.

This YUV data of 1280 pixels×8 lines is inputted via the SDRAM control circuit 30 to the SDRAM 58 where it is stored in its JPEG work area shown in FIG. 6. In also this case, the CPU 44 loads a head address of the JPEG work area onto the controller 28a so that the controller 28a sends address data to the SDRAM control circuit 30. Because the YUV conversion is at a ratio of 4:2:2, the YUV data having 1280 pixels×8 lines is 20480 bytes (=1280 pixels×8 lines×16 bits/8 bits), i.e. 20 K bytes. Therefore the JPEG work area, if having 40 K bytes, can write the YUV data in an amount of 1280 pixels×16 lines. That is, certain 8 lines of YUV data are written in a first half 20 K-byte area of the JPEG work area, while the succeeding 8 lines of YUV data are in a latter half 20 K-byte area of the JPEG work area.

Figure 10:
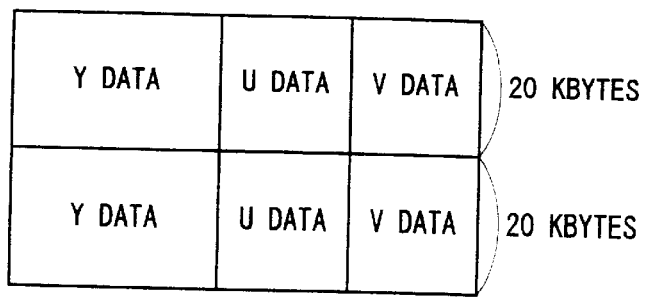
FIG. 10 is an illustrative view showing a JPEG work area provided in the SDRAM.

The SDRAM control circuit 30 stores Y data, U data and V data separately in accordance with address data sent from the buffer control circuit 28, as shown in FIG. 10. Because 8 lines of Y data is 10 K bytes, this Y data is stored in a first half of one 20 K-byte area. Each of 8-lines U data and V data is 5 K bytes, the are separately stored in the remaining site of 10 K bytes.

After completing the writing-in of the 8-lines YUV data, the CPU 44 creates thumbnail image data based on the 8-lines YUV data. There are 10240 pixels (1280 pixels×8 lines) of YUV data existing in the 20 K-byte area. If 64 pixels (8 pixels×8 lines) is assumed as 1 block, the YUV data in the 20 K-byte area can be divided into 160 blocks. The CPU 44 accesses to the SDRAM 58 via the SDRAM control circuit 30, and read out Y data, U data and V data block by block. From each block, 1 pixel of thumbnail data is created. The CPU 44 then writes, pixel by pixel, the created thumbnail data into a thumbnail work area shown in FIG. 4 through the SDRAM control circuit 30. This provides 160 pixels of thumbnail data from the YUV data of the 20 K-byte area.

If the 160-pixels thumbnail data has been created, the SDRAM control circuit 30 reads Y data, U data and V data, block by block (8 pixels×8 lines), out of the same 20 K-byte area according to address data given from the controller 28*e*. Because these Y data, U data and V data have been separately written in the JPEG work area in the ratio of Y:U:V= 4:2:2. Consequently, first, 1 block of Y data is read out twice. That is, the Y data is read twice consecutively. Next, U data and V data each in 1 block are read out. Such reading-out is repeated by the controller 28*e*. The block data thus read out is inputted to the JPEG CODEC 56 via a bus 62. That is, the JPEG CODEC 56 is repeatedly inputted by block data in the order of Y data, U data and V data. The JPEG CODEC 56 compresses the Y data, U data and V data block by block according to a JPEG format. Each time 1 block compression is completed, the compressed data is inputted to the controller 28*f* through the bus 62.

The controller 28*f* is loaded by a head address of the camera data area shown in FIG. 6. Consequently, the controller 28*f* stores the inputted compressed data into the camera data area through the DRAM control circuit 30. Because there exists camera data unprocessed of YUV conversion or compression in the SDRAM 58, the compressed data is written over the camera data area in a manner avoiding such unprocessed camera data. In other words, the compressed data is written over the camera data already completed of compression. Because the amount of the compressed data is less than that of the camera data, if the compressed data is written starting from a head of the camera data area, there is no possibility of writing the compressed data over unprocessed camera data. It is therefore possible to reduce the memory capacity due to writing the compressed data over the camera data area in this manner.

Simultaneous with the compression of the 8-lines YUV data stored in the JPEG work area, the next 8-lines camera data is read out of the camera data area by the controller 28*d*. This camera data is subjected to YUV conversion by the signal processing circuit 24. The YUV data is written on the JPEG work area by the controller 28*a*. When the YUV data stored in one 20 K-byte area is being compressed, the newly created YUV data is stored to the other 20 K-byte area.

In this manner, a memory capacity of 40 K bytes, i.e., 16 lines, is secured for the JPEG work area whereby the compression on the current YUV data and the creation for the next YUV data are concurrently carried out. If compression is completed for all the camera data stored in the camera data area, compressed data corresponding to all of the camera data is obtained in the camera data area. At the same time, thumbnail data corresponding to all the camera data is obtained in the thumbnail work area. The CPU 44, when compression has been completed, reads the compressed data out of the camera data area through the SDRAM control circuit 30, and thumbnail data out of the thumbnail work area. The compressed data and the thumbnail data are recorded to a flash memory 54. That is, the CPU 44 records the compressed data and thumbnail data corresponding to the whole camera data, at one time, into the flash memory 54.

Figure 11:
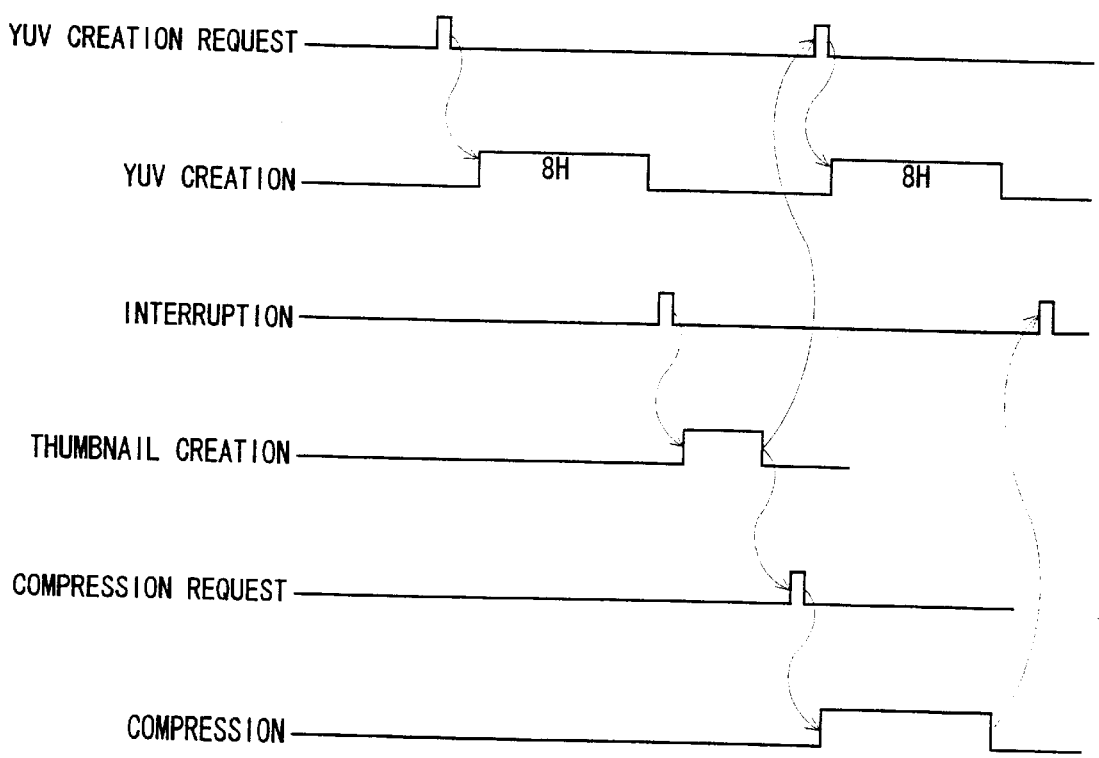
FIG. 11 is a timing chart showing part of operation in the camera mode.

Explanation will be made on the operation to convert the camera data in the camera data area, 8 lines a time, into compressed data, using FIG. 11. If the CPU 44 sends a YUV creation request to the buffer control circuit 28, the buffer control circuit 28 reads 8-lines camera data out of the SDRAM 58 and input it to the signal processing circuit 24. Due to this, the signal processing circuit 24 outputs the 8-lines YUV data. The buffer control circuit 28 writes the created 8-lines YUV data onto the JPEG work area.

Thereafter, the CPU 44 outputs an interrupt request to the buffer control circuit 28 and accesses itself to the SDRAM 58. The CPU 44 then creates thumbnail data from the 8-lines YUV data stored in the JPEG work area, and writes the thumbnail data onto the thumbnail work area. After creating the thumbnail data corresponding to the 8-lines YUV data, the CPU 44 sends a YUV creation request and compression request to the buffer control circuit 28. This makes it possible to concurrently carry out creation of YUV data for the next 8 lines and compression of the 8-lines YUV data written on the JPEG work area. After completing both the YUV creation and the compression processes, the CPU 44 outputs again an interrupt request to the buffer control circuit 28.

Figure 12:
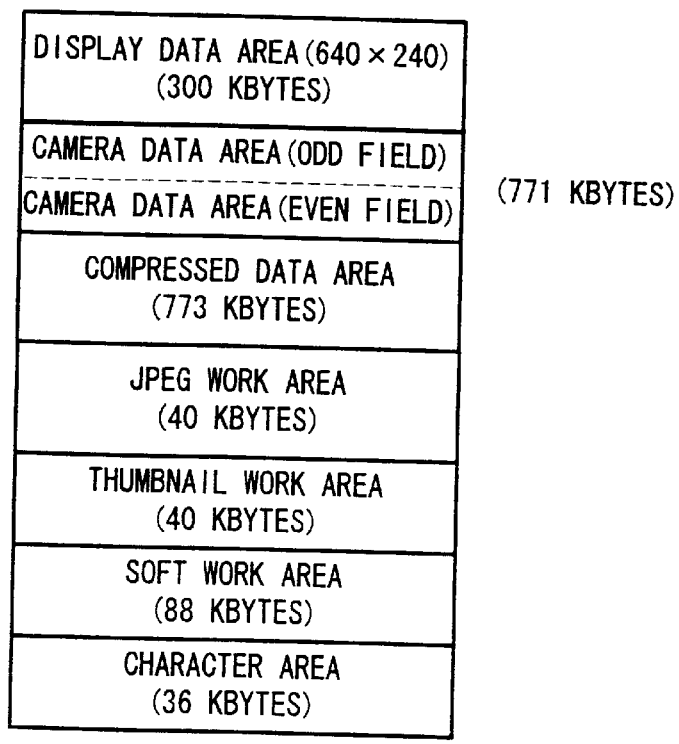
FIG. 12 is an illustrative view showing an SDRAM mapping state in the continuous shot mode.

If the operator sets a continuous-shot mode on/off switch 50 to an on side and then keeps depressing the shutter button 52, a photographic subject is taken 10 times at a predetermined interval. That is, the CCD imager 12 intermittently outputs 10 times interlace scan camera signals each having 1280 pixels×960 lines. In the continuous shot mode, the CPU 44 sets the thinning-out circuit 22 of a vertical thin-out rate at "½" and a horizontal thin-out rate at "0". This decreases the number of lines of the camera data output from the A/D converter 20 down to "480". The buffer control circuit 28 is inputted, intermittently 10 times, by the interlace scan camera data having 1280 pixels×480 lines. The CPU 44 also loads the head addresses of respective areas onto the buffer control circuit 28, in order to give mapping on the SDRAM 58, as shown in FIG. 12.

Because in the continuous shot mode the number of lines of the camera data input to the controller 28*a* is a half of that of the normal camera mode, the capacity of the camera data area is satisfactory if having 771 K bytes or a half of 1.5 M bytes. The CPU 44 uses the remaining 773 K bytes, for creating the compression data area.

The controller 28*a* stores intermittently-coming interlace scan camera data into the camera data area through the SDRAM control circuit 30. In also this case, odd field data is stored to a first half (odd field area) of the camera data area, while even field data is to a latter half (even field area) of the camera data area. The camera data written on the camera data area is thereafter read alternately from the odd field area and the even field area by the controller 28*d*, and subjected to YUV conversion and thinning-out respectively by the signal processing circuit 24 and the thinning-out circuit 26 in a similar manner to the normal camera mode. However, because the number of lines of the YUV data is "480", the thinning-out circuit 26 is-set of a vertical thin-out rate at "½".

The 640 pixels×240 lines of YUV data from the thinning-out circuit 26 is written onto the display data area by the controller 28*a*. The controller 28*b* reads the YUV data out of the display data area, similarly to the normal camera mode. Finally, a freeze picture corresponding to the YUV data is displayed on the LCD 40.

The camera data stored within the camera data area is read out 8 lines at a time, and then subjected to YUV conversion. The 8-lines YUV data is sent back to the SDRAM 58 without thinning out, and written onto the JPEG work area. In also the continuous shot mode, the CPU 44 creates thumbnail data from this 8-lines YUV data similarly to the normal camera mode, and the JPEG CODEC 56 compresses the 8-lines YUV data block by block. In the continuous shot mode, however, a compression data area is formed within the SDRAM 58. There is accordingly no possibility that the compressed data output from the JPEG CODEC by written over the camera data area. In other words, the controller 28f writes the compressed data onto the compression data area. Thumbnail data creation and JPEG-formatted compression as-above area repeated every 8 lines, thereby obtaining thumbnail data and compressed data corresponding to 1 sheet of camera data at the compressed data and thumbnail work area.

In the continuous shot mode, even after completing the compression of the 1 sheet of camera data, another camera data is outputted from the CCD imager 12. This camera data also has to be stored in the camera data area. Due to this, the compression data area is formed in the SDRAM 58 so that compressed data to be created by the JPEG CODEC 56 can be all stored within the compression data area.

If the compression data area and the thumbnail work area are respectively stored with 10 sheets of thumbnail data and compressed data, the CPU 44 records these data collectively into the flash memory 54. That is, thumbnail data and compressed data are repeatedly created 10 times. The created 10-sheets thumbnail data and compressed data are recorded at one time. On the other hand, the freeze picture displayed on the LCD 40 is renewed each time compression of the corresponding image data completes. Due to this, 10-sheet pictures having been taken are displayed each for a predetermined time.

Figure 13:
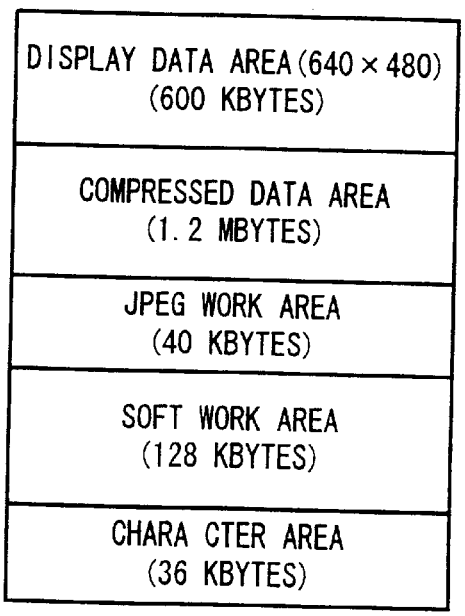
FIG. 13 is an illustrative view showing an SDRAM mapping state in the reproduce mode.

If the operator sets a mode change switch 48 to a reproduce side, a system controller 46 supplies a reproduce command to the CPU 44. Thereupon, the CPU 44 loads head addresses as shown in FIG. 7(C) onto the buffer control circuit 28, and gives mapping on the SDRAM 58 as shown in FIG. 13. On the SDRAM 58 are formed a display area of 60 K bytes and a compression data area of 1.2 M bytes. That is, the display area has a capacity as large as twice that in the camera mode, while the compression data area has a capacity of about 1.5 times that in the camera mode.

The compressed data recorded on the flash memory 54 is reproduced by the CPU 44. The CPU 44 writes reproduced compressed data onto the compression data area through the SDRAM control circuit 30. The compressed data written on the compression data area is thereafter read out by the controller 28f, and sent to the JPEG CODEC 56 through the bus 64. The JPEG CODEC 56 decompresses block by block the compressed data input, and inputs the decompressed data to the controller 28e through the bus 62. The controller 28e stores block by block the decompressed data into the JPEG work area.

Where reproducing the image data having been taken and recorded in the normal camera mode, the decompressed YUV data has a data amount of 1280 pixels×960 lines. However, the display area of 600 K bytes can store, at most, 840 pixels×980 lines. Consequently, the CPU 44 performs thinning-out in a software fashion on the decompressed data stored in the JPEG work area. The thin-out ratio at this time is "1/2"in the respective horizontal and vertical directions. This provides YUV data of 640 pixels×980 lines. The CPU 44 writes the thinned-out YUV data into the display area through the SDRAM control circuit 30. The YUV data thus written in the display area is read by the controller 28b similarly to the camera mode, and finally a reproduced picture is displayed on the LCD 40.

As will be understood from the above explanations, in every mode the controller 28a writes the data inputted through the switch SW2 to a desired area of the SDRAM 58. The controller 28b, also in every mode, plays a role to read data out of the display data area. On the other hand, the controller 28d in the camera mode plays a role to read data out of the camera data area. The controller 28e in the camera mode inputs the data to be compressed into the JPEG CODEC 56, and in the reproduce mode receives the data decompressed by the JPEG CODEC 56. The controller 28f in the camera mode receives the data compressed by the JPEG CODEC 56, and in the reproduced mode inputs the data to be decompressed to the JPEG CODEC 56. Incidentally, the controller 28c plays a role to read character data from a character area shown in FIGS. 6, 12 and 13.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital camera comprising:

an outputter for outputting first image data of an object photographed in response to a photographing instruction;

a first writer for writing said first image data outputted from said outputter to an image data area;

a data processor for subjecting said first image data stored in said image data area to a predetermined data process;

a second writer for writing second image data produced by said data processor to a work area;

a compressor for producing compressed image data on the basis of said second image data stored in said work area;

an overwriter for writing said compressed data produced by said compressor over said image data of the same object stored in said image data area; and a recorder for recording said compressed image data stored in said image data area into a recording medium, wherein said compressor performs a compression process every first number of pixels, and said overwriter performs an overwriting process in a manner avoiding said first image data to which neither said predetermined data process nor said compression process is subjected.

2. A digital camera according to claim 1, wherein said compressor performs a compression process according to a JPEG format.

3. A digital camera according to claim 1, wherein said first image data has color components different on a pixel-by-pixel basis, and said second image data is data according to YUV format.

4. A digital camera according to claim 1, wherein said first image data is interlace scan data, and said first writer writes odd field data and even field data separately into said image data area.

5. A digital camera according to claim 1, wherein said data processor subjects said first image data to said predetermined data process every second number of pixels, which is greater than said first number of pixels.

6. A digital camera according to claim 1, wherein said outputter includes an imager for capturing an optical image of said object, and said first image data is digital data of a photographed image signal outputted from said imager.

7. A digital camera according to claim 5, further comprising a thumbnail creator for creating thumbnail image data from said second image data written to said work area every said second number of pixels,
wherein said recorder records said compressed image data and said thumbnail image data into said recording medium.

* * * * *